United States Patent [19]

Lonsdale

[11] 4,180,336
[45] Dec. 25, 1979

[54] TOUCH CHECKING KEY TOPS FOR KEYBOARD

[75] Inventor: Alice Lonsdale, Berkeley, Calif.

[73] Assignee: Safeway Stores, Incorporated, Oakland, Calif.

[21] Appl. No.: 854,626

[22] Filed: Nov. 25, 1977

[51] Int. Cl.² .............................................. B41J 5/08
[52] U.S. Cl. ................................ 400/491.3; 400/483; 400/494; 235/145 R
[58] Field of Search ..................... 400/483, 491.3, 494; 235/145 R

[56] References Cited

U.S. PATENT DOCUMENTS

| | | | |
|---|---|---|---|
| 1,718,694 | 6/1929 | Kurowski | 400/494 X |
| 3,396,827 | 8/1968 | Harwell | 400/491.3 |
| 3,860,771 | 1/1975 | Lynn et al. | 400/491.3 X |

Primary Examiner—Ernest T. Wright, Jr.
Attorney, Agent, or Firm—Flehr, Hohbach, Test, Albritton & Herbert

[57] ABSTRACT

Touch checking key tops for keyboard on a cash register in which the keyboard is provided with a plurality of keys arranged in a generally rectangular matrix with the keys being arranged in three rows extending in one direction and three rows extending in a direction at substantially right angles to the other three rows. The keys are assigned the digits 1 through 9 with four of the keys being disposed on the corners of the matrix. The keys have key tops. The key tops for the four keys on the four corners of the rectangular matrix have diagonally disposed ridges formed thereon which serve as tactile indicia to the operator using the keyboard to improve the operator's confidence and productivity and to minimize operator errors.

5 Claims, 4 Drawing Figures

U.S. Patent     Dec. 25, 1979     4,180,336
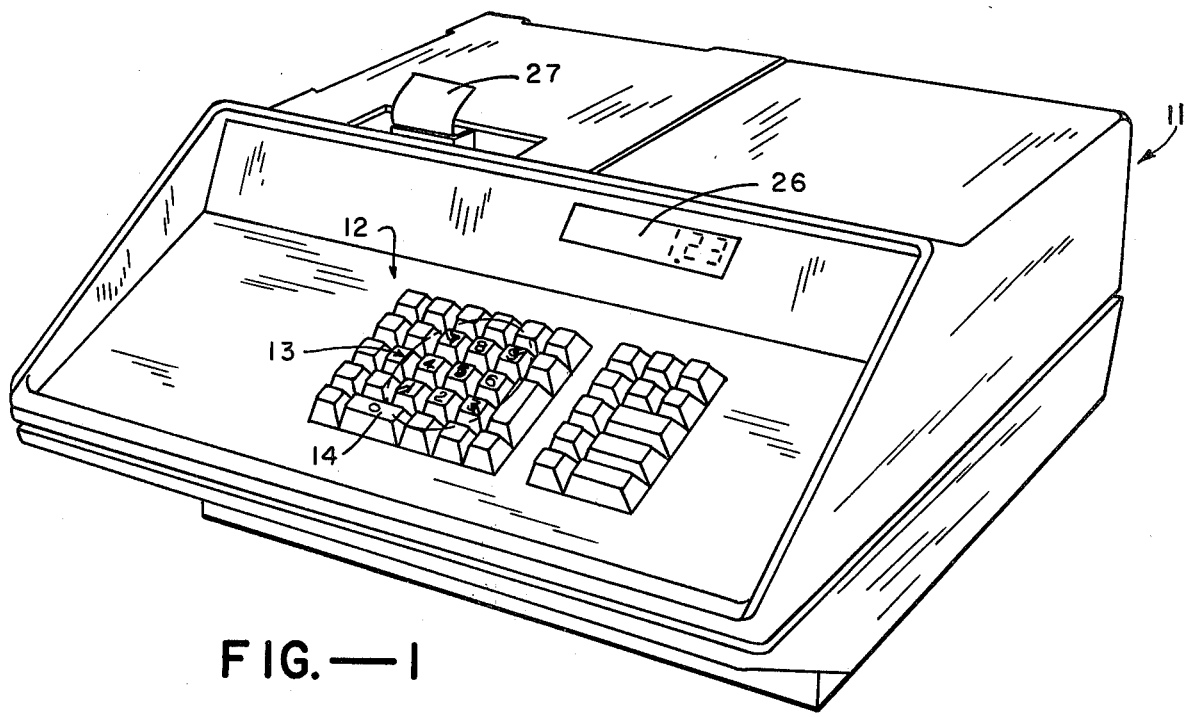
FIG.—1
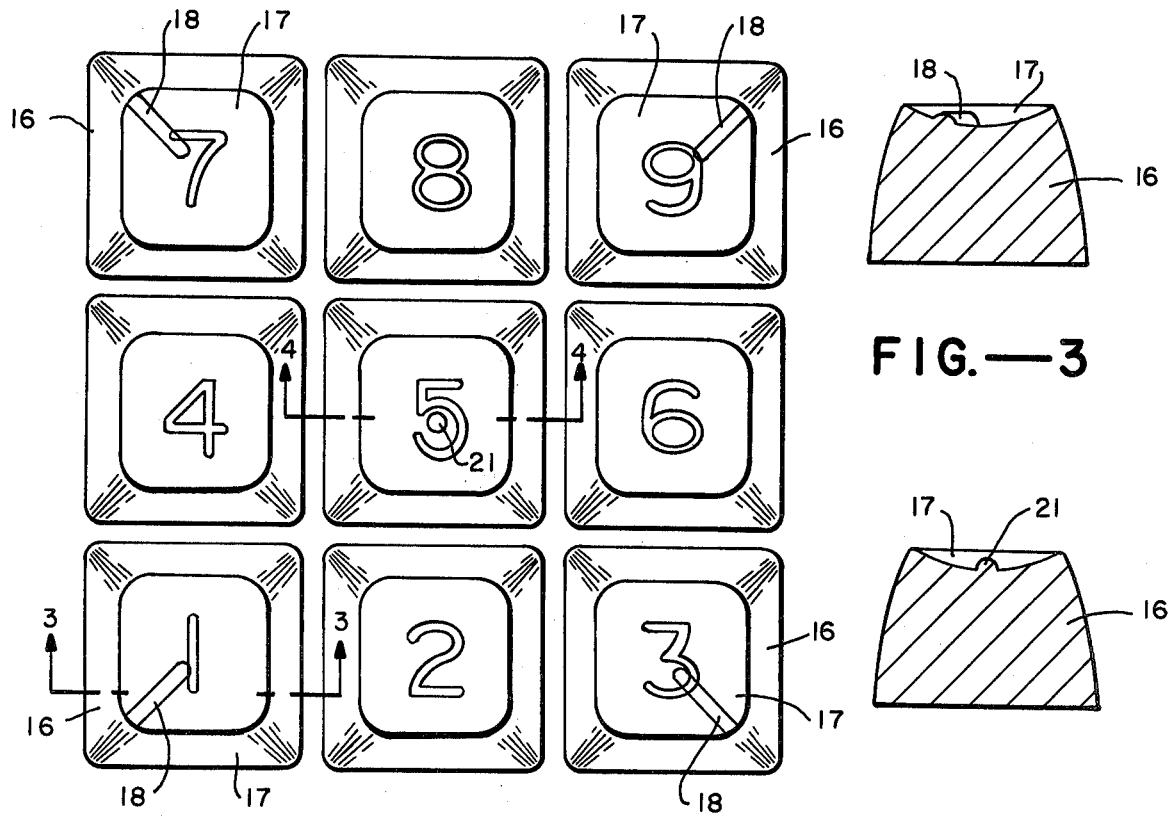
FIG.—2
FIG.—3
FIG.—4

TOUCH CHECKING KEY TOPS FOR KEYBOARD

BACKGROUND OF THE INVENTION

Tactile types of keyboards heretofore have been provided on typewriters and on cash registers. A typical tactile keyboard is disclosed in U.S. Pat. No. 3,396,827. As pointed out in said U.S. Pat. No. 3,396,827, the invention therein disclosed is directed to a commercially acceptable touch keyboard for cash registers. However, at the present time, keyboards for cash registers are still appearing without tactile keyboards. With the advent of electronic cash registers with ten-key keyboards on the same, it has been found that it is desirable to provide additional tactile feedback to the operator to supplement the checker's confidence and to improve the productivity of the operator and to minimize ring-up errors of the operator. Tactile keyboards which have heretofore been provided have been unduly complex and thus have made it difficult to manufacture and in addition have made them difficult for operators to utilize and obtain confidence in the same. There is, therefore, need for a new and improved tactile keyboard.

SUMMARY OF THE INVENTION AND OBJECTS

The touch checking key tops are for a computer-type keyboard for use on a cash register. The keyboard consists of a plurality of keys which are arranged in a generally rectangular matrix with the keys being in three rows extending in one direction and three rows extending in a direction substantially at right angles to the other three rows. The keys are assigned digits of 1 through 9. The four keys disposed on the corners of the rectangular matrix having diagonally disposed ridges formed thereon and serving as tactile indicia. The center key top has a dot formed thereon which also serves as tactile indicia to the operator.

In general, it is an object of the present invention to provide touch checking key tops for keyboards to give tactile feedback to the operator.

Another object of the invention is to provide touch checking key tops of the above character which are particularly useful for electronic cash registers.

Another object of the invention is to provide touch checking key tops which make it possible to improve the operator's confidence and productivity and to minimize operator errors.

Another object of the invention is to provide touch checking key tops of the above character which are simple to manufacture.

Another object of the invention is to provide touch checking key tops of the above character which have tactile indicia which can be readily learned by the operator.

Additional objects and features of the invention will appear from the following description in which the preferred embodiment is set forth in detail in conjunction with the accompanying drawing.

BRIEF DESCRIPTION OF THE DRAWING

FIG. 1 is a perspective view of an electronic cash register having as a part thereof a touch checking keyboard incorporating the present invention.

FIG. 2 is an enlarged plan elevational view of the key tops of the keyboard shown in FIG. 1.

FIG. 3 is a cross sectional view taken along the line 3—3 of FIG. 2.

FIG. 4 is a cross sectional view taken along the line 4—4 of FIG. 2.

DESCRIPTION OF THE PREFERRED EMBODIMENT

In FIG. 1 there is shown a data terminal system of a conventional type as, for example, a series 400 manufactured by Data Terminal Systems of Maynard, Massachusetts. The model 440 of the 400 series is a stand alone electronic cash register 11 which is desired for supermarkets and similar operations.

The electronic cash register 11 is provided with a keyboard 12 having a plurality of keys 13 with ten of the keys being associated with the numerals 0 through 9. One of the ten keys is a zero key 14 whereas the other nine keys are provided within a rectangular matrix, nominally a square and have the numerals 1 through 9 associated therewith as shown in enlarged form in FIG. 2. A number of other keys are provided in the keyboard 12 and are of a type conventionally used by supermarkets. For example, they can indicate the type of products being sold, the taxes to be added and the like. As shown, particularly in FIG. 2, the nine digit keys of the keyboard 12 are arranged in three spaced parallel rows extending in one direction and three spaced parallel rows extending in a direction substantially perpendicular or at right angles to the first named rows. As shown in FIG. 2, the first row counting from the bottom and counting from the left to right has keys which carry the numbers 1, 2 and 3; the second row has numbers 4, 5 and 6; and the third row has numbers 7, 8 and 9.

The keys 13 are provided with key tops 16 formed of a suitable material such as plastic with the side walls being curved and tapered inwardly towards the upper extremities of the same. The key tops also are provided with dish-shaped recesses 17 which are generally rectangular in configuration with rounded corners as shown in FIG. 2. The four key tops provided on the four corners on the rectangular matrix and carrying the numerals 1, 3, 7 and 9 are provided with raised tactile indicators in the form of raised diagonally extending bars or bar-like portions 18 which are disposed within the dish-shaped recesses 17 and which extend inwardly from the corners of the recesses 17 which are on the corners of the matrix. The bars 18 extend inwardly from the corners a distance approximately adjacent the centers of the dish-shaped recesses 17. Thus, it can be seen that the raised bar-like portions 18 extend along the diagonals of the rectangular matrix in such a manner that they extend in a direction towards the center of the matrix. In other words, the four corner key tops are provided with diagonal corner coding which can be readily recognized by the operator touching the keys to provide tactile indication of the keys being touched by the operator.

In addition to the four diagonal corner raised portions or bars 18 there is provided one additional tactile indicator in the form of a raised dot 21 provided in the center key top (assigned the numeral 5) within the center of the dish-shaped region 17. Thus of the total of nine keys, tactile indicators are provided on five of the nine keys with the keys assigned the numbers 2, 4, 6 and 8 being without tactile indicators. It has been found that by providing the coding on the four corner keys and the center key a sufficient number of the keys have been coded so that there is sufficient tactile feedback to the operator to give the operator confidence in the operations carried out by the operator. Since the coding utilized is relatively simple, the coding can be readily learned by the operator. This is particularly advantageous when the keyboard 12 is utilized in connection with an electronic cash register, as for example, in supermarkets where it is desired to improve the productivity of the operator and also to minimize errors.

An electronic cash register 11, as shown in FIG. 1, provides a digital display 26 and also provides a printed tape 27 recording the information which has been inserted through the keyboard 12.

Although the keyboard has been described principally for use with electronic cash registers, it can be appreciated that, if desired, the tactile type keyboard disclosed herein also can be utilized in other applications. The tactile indicators which are provided are relatively simple and are only provided on a small number of the keys so that the cost of manufacture is relatively low. In addition, the tactile indicators utilized are such that they can be readily learned and used by the operator to improve the productivity of the operator and also to minimize errors.

What is claimed is:

1. In touch checking key tops for a keyboard for use on a cash register, a plurality of nine keys arranged in a generally square matrix with the digits 1 through 9 being assigned thereto, the keys being arranged in three spaced apart parallel rows, the keys also being arranged in three rows extending in a direction at substantially right angles to the spaced apart parallel three rows so that there are three keys forming each side of the square matrix with a key in the center and one key on each of the four corners of the square matrix, each of said four corner keys in the matrix having diagonally disposed raised portions formed on the keys and serving as tactile indicators to the operator, the center key of the matrix having a raised portion different from the diagonally disposed raised portions on said four keys and serving as a tactile indicator to the operator, the remaining keys of said nine keys being free of tactile indicators.

2. Touch checking key tops as in claim 1 in which the four corner keys have been assigned the numerals 1, 3, 7 and 9.

3. Touch checking key tops as in claim 1 in which the raised portion for the center key is in the form of a raised dot.

4. Touch checking key tops as in claim 1 wherein said key tops are provided with dish-shaped recesses on the tops thereof.

5. Touch checking key tops as in claim 1 wherein said raised portions extend inwardly from the four corners of the rectangular matrix.

* * * * *

UNITED STATES PATENT AND TRADEMARK OFFICE
CERTIFICATE OF CORRECTION

PATENT NO. : 4,180,336
DATED : December 25, 1979
INVENTOR(S) : Alice Lonsdale

It is certified that error appears in the above–identified patent and that said Letters Patent are hereby corrected as shown below:

Claim 1, Column 4, line 7, after the word " matrix", delete the words [each of].

Signed and Sealed this

Twenty-fourth Day of August 1982

[SEAL]

Attest:

GERALD J. MOSSINGHOFF

Attesting Officer      Commissioner of Patents and Trademarks